（12）United States Patent
Yamamoto

(10) Patent No.: US 10,266,030 B2
(45) Date of Patent: Apr. 23, 2019

(54) AIR CONDITIONING UNIT FOR VEHICLE

(71) Applicant: DENSO CORPORATION, Kariya, Aichi-pref. (JP)

(72) Inventor: Masakazu Yamamoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/571,999

(22) PCT Filed: Mar. 17, 2016

(86) PCT No.: PCT/JO2016/058595
§ 371 (c)(1),
(2) Date: Nov. 6, 2017

(87) PCT Pub. No.: WO2016/185779
PCT Pub. Date: Nov. 24, 2016

(65) Prior Publication Data
US 2018/0134113 A1 May 17, 2018

(30) Foreign Application Priority Data
May 20, 2015 (JP) ................................. 2015-102888

(51) Int. Cl.
*B60H 1/00* (2006.01)
(52) U.S. Cl.
CPC ..... *B60H 1/00057* (2013.01); *B60H 1/00564* (2013.01); *B60H 1/00685* (2013.01); *B60H 2001/00092* (2013.01); *B60H 2001/00164* (2013.01); *B60H 2001/00185* (2013.01); *B60H 2001/00721* (2013.01)

(58) Field of Classification Search
CPC ............ B60H 1/00057; B60H 1/00564; B60H 1/00685; B60H 2001/00092; B60H 2001/00164; B60H 2001/00185; B60H 2001/00721
See application file for complete search history.

(56) References Cited

U.S. PATENT DOCUMENTS

| 2011/0076931 A1* | 3/2011 | Ikeda | ................. B60H 1/00857 |
| | | | 454/152 |
| 2012/0208444 A1* | 8/2012 | Han | ................... B60H 1/00692 |
| | | | 454/141 |
| 2018/0126820 A1* | 5/2018 | Makimoto | ......... B60H 1/00028 |

FOREIGN PATENT DOCUMENTS

| JP | 2007125955 A | 5/2007 |
| JP | 2008143514 A | 6/2008 |
| JP | 2009119912 A | 6/2009 |

* cited by examiner

*Primary Examiner* — Marc E Norman
(74) *Attorney, Agent, or Firm* — Harness, Dickey & Pierce, P.L.C.

(57) ABSTRACT

An air conditioning case in an air conditioning unit for a vehicle forms a first air passage, a second air passage bypassing the first air passage, and a mixing space connected to a first blowing port and a second blowing port through which air is blown out into a vehicle interior. A cooling heat exchanger cools and allows air to flow into the first air passage and the second air passage. A heating heat exchanger is disposed in the first air passage. A tunnel forming portion provides a tunnel passage into which a part of air from the first air passage flows. The tunnel forming portion includes a first outflow portion connected to the first blowing port, and a second outflow portion connected to the second blowing port, and separates the air flowing in the tunnel passage from the air flowing from the second air passage.

11 Claims, 6 Drawing Sheets

AIR CONDITIONING UNIT FOR VEHICLE

CROSS REFERENCE TO RELATED APPLICATIONS

This application is a U.S. National Phase Application under 35 U.S.C. 371 of International Application No. PCT/JP2016/058595 filed on Mar. 17, 2016 and published in Japanese as WO 2016/185779 A1 on Nov. 24, 2016. This application is based on and claims the benefit of priority from Japanese Patent Application No. 2015-102888 filed on May 20, 2015. The entire disclosures of all of the above applications are incorporated herein by reference.

TECHNICAL FIELD

The present disclosure relates to an air conditioning unit for a vehicle which blows an air conditioning wind in which a cold air and a warm air are mixed together into a vehicle interior.

BACKGROUND ART

Up to now, the air conditioning unit for a vehicle of this type is disclosed in, for example, Patent Literature 1. In the vehicle air conditioning unit disclosed in Patent Literature 1, a baffle is installed in an air conditioning case as a component for controlling a temperature of a blowing air. Specifically, multiple grid tunnels for leading a warm air from a heater core, which is a heating heat exchanger, to a defroster blowing port are provided in the baffle. With the grid tunnel, a blowing air temperature at the defroster blowing port is optimized, as a result of which windows of the vehicle are prevented from being fogged and visibility through the windows is secured.

PRIOR ART LITERATURE

Patent Literature

Patent Literature 1: JP 2008-143514 A

SUMMARY

In order to optimize the blowing air temperature at the defroster blowing port with the use of the baffle as in Patent Literature 1, it is important how to efficiently introduce the warm air from the heater core to the defroster blowing port. For example, when the baffle is used as in Patent Literature 1, with an increase in the number of grid tunnels for introducing the warm air from the heater core to the defroster blowing port, a temperature variation of the blown out air at the defroster blowing port is reduced. Alternatively, with an increase in a tunnel cross-sectional area per grid tunnel, the temperature variation of the blown out air at the defroster blowing port is reduced. As a result of the reduction in the temperature variation of the blown out air, great results are expected to prevent the windows of the vehicle from being fogged.

However, in addition to the defroster blowing port, a face blowing port and a foot blowing port are also usually provided as blowing ports into a vehicle interior. Both of a method for increasing the number of grid tunnels and a method for increasing the tunnel cross-sectional area described above are to constantly increase the amount of air flowing toward the defroster blowing port in the warm air from the heater core. Accordingly, if the amount of air flowing toward the defroster blowing port is always thus increased by the grid tunnels, when the blowing air temperature is adjusted by mixing the warm air with the cold air in a face mode, a bi-level mode or the like, a mixing ratio of the warm air decreases. As a result, the temperature variation at the face blowing port would be expanded.

In other words, in the baffle disclosed in Patent Literature 1, if the air flow amount is increased in order to sufficiently secure the amount of warm air flowing into one blowing port (for example, defroster blowing port) through the grid tunnels, the amount of warm air flowing into the other blowing ports (for example, face blowing port) may be insufficient. As a result of detailed examination by the inventors, the facts described above have been found.

In view of the above points, it is an objective of the present disclosure is to provide an air conditioning unit for a vehicle, which is capable of preventing an insufficient amount of warm air led to an open one among a first blowing port and a second blowing port even in a blowing mode in which either the first blowing port as one blowing port or the second blowing port as another blowing port is open.

In order to achieve the above objective, according to an aspect of the present disclosure, an air conditioning unit for a vehicle includes:

an air conditioning case that includes a first air passage through which air flows toward a vehicle interior, a second air passage through which air bypasses the first air passage and flows toward the vehicle interior, a mixing space that is connected to the first air passage and the second air passage and is a space where the air flowing out of the first air passage and the air flowing out of the second air passage are mixed, and a first blowing port and a second blowing port that are connected to the mixing space and are ports from which air is blown into the vehicle interior;

a cooling heat exchanger that is disposed in the air conditioning case, cools air, and allows the cooled air to flow into the first air passage and the second air passage;

a heating heat exchanger that is disposed in the first air passage, and heats air flowing in the first air passage;

an air flow ratio adjusting device that adjusts a ratio between an amount of air flowing from the cooling heat exchanger to the first air passage and an amount of air flowing from the cooling heat exchanger to the second air passage;

a first blowing port open-close device that opens and closes the first blowing port;

a second blowing port open-close device that opens and closes the second blowing port; and a tunnel forming portion that is disposed in a part of the mixing space and provides a tunnel passage into which a part of air having passed through the heating heat exchanger flows from the first air passage, wherein the tunnel forming portion includes a first outflow portion through which the air flows from the tunnel passage to the first blowing port, and a second outflow portion through which the air flows from the tunnel passage to the second blowing port, and the tunnel forming portion separates the air flowing in the tunnel passage from the air flowing from the second air passage.

According to the above disclosure, the tunnel forming portion provides the tunnel passage into which a part of the air having passed through the heating heat exchanger flows from the first air passage. Also, the first outflow portion of the tunnel forming portion causes the air in the tunnel passage to flow out to the first blowing port, and the second outflow portion of the tunnel forming portion causes the air in the tunnel passage to flow out to the second blowing port.

For that reason, the warm air that has heated by the heating heat exchanger and passed through the tunnel passage can flow to the first blowing port if the first blowing port is opened by the first blowing port open-close device, and the warm air can flow to the second blowing port if the second blowing port is opened by the second blowing port open-close device.

Therefore, even in a blowing mode in which the first blowing port or the second blowing port is opened, the insufficient amount of warm air led to the opened blowing port of the first blowing port and the second blowing port can be prevented.

DESCRIPTION OF EMBODIMENTS

Figure 1:
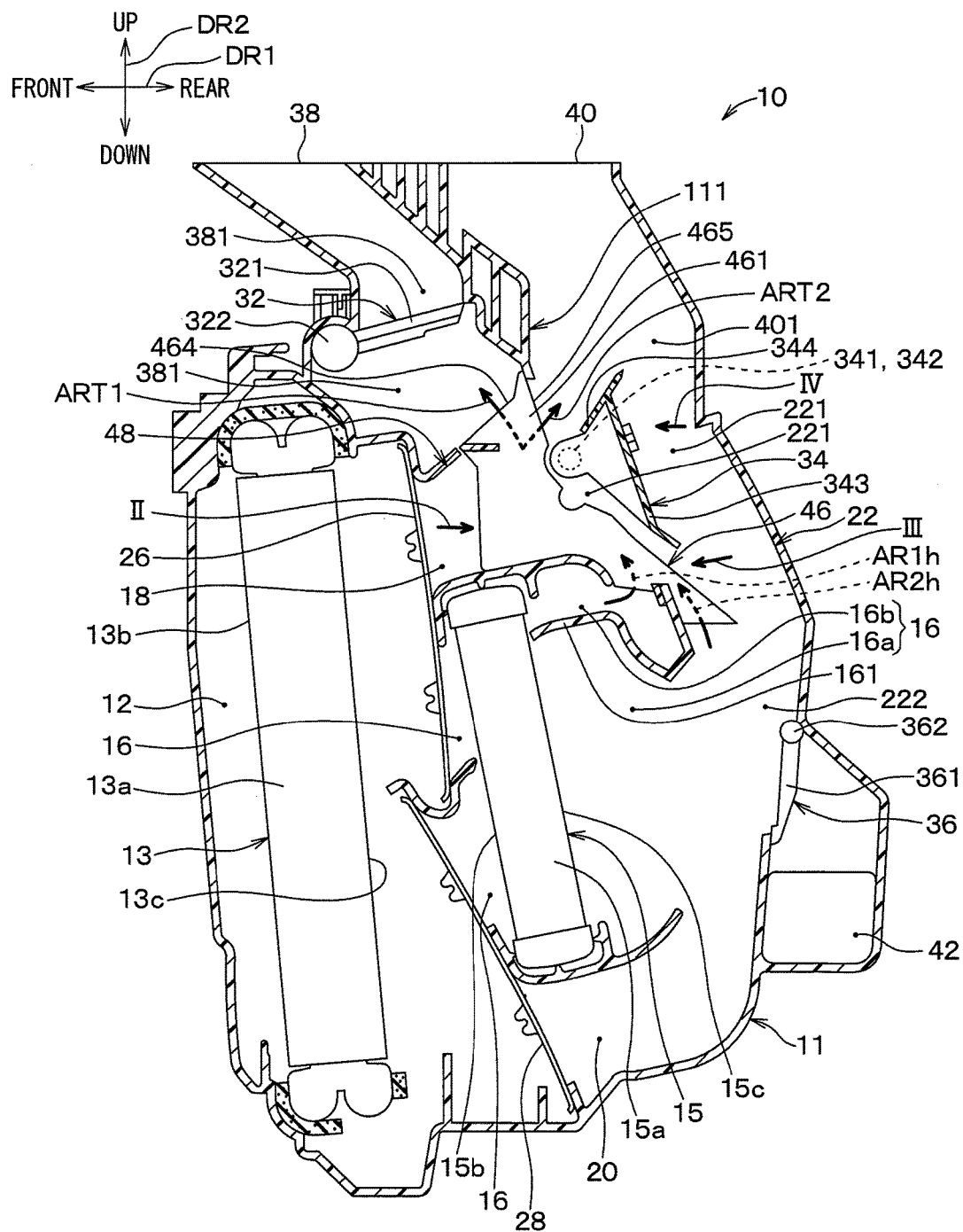
FIG. 1 is a cross-sectional view showing a schematic configuration of an air conditioning unit for a vehicle according to a first embodiment.

Hereinafter, embodiments of the present disclosure will be described with reference to the drawings. The same or equivalent parts between the respective embodiments including the other embodiments described later are assigned the same numeral in the drawings.

First Embodiment

FIG. 1 is a cross-sectional view showing a schematic configuration of an air conditioning unit 10 for a vehicle according to the present embodiment. Arrows DR1 and DR2 in FIG. 1 and an arrow DR3 in FIG. 2 indicate directions of the vehicle on which the vehicle air conditioning unit 10 is mounted. In other words, the arrow DR1 in FIG. 1 indicates a vehicle longitudinal direction DR1, the arrow DR2 indicates a vehicle vertical direction DR2, and the arrow DR3 in FIG. 2 indicates a vehicle width direction DR3 (that is, a vehicle lateral direction DR3).

The vehicle air conditioning unit 10 for a vehicle (hereinafter simply referred to as air conditioning unit 10) illustrated in FIG. 1 is included in a vehicle interior unit section forming a part of a vehicle air conditioning apparatus having a refrigeration cycle configured by a compressor, a condenser, and the like disposed in an engine compartment. The air conditioning unit 10 is disposed substantially in the center of the vehicle width direction DR3 (refer to FIG. 1) inside an instrument panel not shown in a front portion of a vehicle interior. The vehicle interior unit section of the vehicle air conditioning apparatus is roughly divided into the air conditioning unit 10 in the substantially central portion and a not-illustrated blower unit offset at a front passenger seat side inside the instrument panel.

As is well known, the blower unit includes an inside and outside air switching box that selectively introduces an outside air which is a vehicle exterior air or an inside air which is a vehicle interior air, and a centrifugal blower that blows the air introduced into the inside and outside air switching box. The blown air in the blower unit flows into an air inflow space 12 at a foremost portion in the air conditioning case 11 of the air conditioning unit 10 illustrated in FIG. 1.

The air conditioning unit 10 includes the air conditioning case 11, an evaporator 13, a heater core 15, a first air mixing door 26, a second air mixing door 28, a defroster blowing port door 32, a face blowing port door 34, a foot blowing port door 36, a grid member 46, and the like.

The air conditioning case 11 provides a passage of an air flowing toward the vehicle interior in the air conditioning case 11. The air conditioning case 11 includes the evaporator 13, the heater core 15, the first air mixing door 26, the second air mixing door 28, the defroster blowing port door 32, the face blowing port door 34, the foot blowing port door 36, and the grid member 46.

The air conditioning case 11 is made of a resin having a certain degree of elasticity like polypropylene and excellent in mechanical strength. Specifically, for the reasons of convenience of mold die-cutting, assembling air conditioning equipment in the case, and so on, after the air conditioning case 11 has been divided into multiple divided cases and molded, the multiple divided cases are fastened to each other integrally.

In the air conditioning case 11 of the air conditioning unit 10, the evaporator 13 as a cooling heat exchanger is vertically disposed in the vertical direction at a rear portion of the air inflow space 12. In other words, the evaporator 13 is vertically disposed such that an air inflow surface 13b and an air outflow surface 13c of a core portion 13a in the evaporator 13 extend substantially in the vehicle vertical direction DR2.

Therefore, the blown air of the blower unit flows into the air inflow space 12, and then passes through the core portion 13a of the evaporator 13 from the space 12 from the front to the rear. As has been well known, a low-pressure refrigerant whose pressure has been reduced by a pressure reducing device such as an expansion valve of the vehicle air conditioning refrigeration cycle flows in the evaporator 13, and the low pressure refrigerant absorbs a heat from the blowing air and evaporates, thereby cooling the blown air.

The air conditioning case 11 is configured so that a warm air passage 16 as a first air passage, an upper cold air passage 18 as a second air passage, and a lower cold air passage 20 as a third air passage are provided at the rear of the evaporator 13 in the air conditioning case 11, in other words, on an air flow downstream side of the evaporator 13. All of those passages 16, 18, and 20 are air passages for allowing the air to flow toward the vehicle interior, and are arranged in the order of the upper cold air passage 18, the warm air passage 16, and the lower cold air passage 20 from the upper side, and are arranged in parallel to each other. In other words, the upper cold air passage 18 and the lower cold air passage 20 are bypass passages that allow the air to flow while bypassing the warm air passage 16. The evaporator 13 cools the air in the core portion 13a and flows the cooled air to flow in the warm air passage 16, the upper cold air passage 18, and the lower cold air passage 20.

The heater core 15 is a heating heat exchanger that is disposed in the warm air passage 16 and heats the air flowing in the warm air passage 16. In more detail, as has been well known, the heater core 15 heats the air with a hot water, which is an engine coolant of a vehicle engine as a heat source. The heater core 15 is vertically disposed such that an air inflow surface 15b and an air outflow surface 15c of a core portion 15a in the heater core 15 extend substantially in the vehicle vertical direction DR2.

For that reason, in the air conditioning case 11, the warm air, which is the air heated by the heater core 15, flows in the warm air passage 16. On the other hand, air that is not heated by the heater core 15 after having passed through the evaporator 13, that is, the cold air bypasses the heater core 15 and flows in the upper cold air passage 18 and the lower cold air passage 20.

Further, the air conditioning case 11 has a warm air passage partition wall 161 on the air flow downstream side of the heater core 15 in the warm air passage 16. The warm air passage partition wall 161 divides the warm air passage 16 into a main warm air passage 16a and a sub warm air passage 16b thinner than the main warm air passage 16a on the air flow downstream side of the heater core 15. The main warm air passage 16a and the sub warm air passage 16b are provided to allow the air to flow in parallel to each other, and the sub warm air passage 16b is disposed above the main warm air passage 16a.

Both of the first air mixing door 26 and the second air mixing door 28 are formed of well-known film doors which are slid by a drive mechanism not shown. Both of the first air mixing door 26 and the second air mixing door 28 are disposed at the air flow upstream end of the warm air passage 16, the upper cold air passage 18, and the lower cold air passage 20. In short, the first air mixing door 26 and the second air mixing door 28 are disposed between the evaporator 13 and the heater core 15.

The first air mixing door 26 is disposed on an upper side of the second air mixing door 28 and opens and closes the upper cold air passage 18 and appropriately the upper half of the warm air passage 16. The second air mixing door 28 opens and closes the lower cold air passage 20 and approximately the lower half of the warm air passage 16.

With such a configuration, the first air mixing door 26 and the second air mixing door 28 as a whole function as an air flow ratio adjusting device. In other words, in the air having passed through the evaporator 13, the first air mixing door 26 and the second air mixing door 28 adjust an air flow ratio between the amount of air flowing through the warm air passage 16, the amount of air flowing through the upper cold air passage 18, and the amount of air flowing through the lower cold air passage 20 as a whole. The first air mixing door 26 and the second air mixing door 28 can adjust the blowing air temperature into the vehicle interior by adjusting the air flow ratio.

Specifically, as with the known air mixing door, the first air mixing door 26 and the second air mixing door 28 are continuously slid between a maximum cooling position and a maximum heating position. The maximum cooling position is a slide position at which the first air mixing door 26 and the second air mixing door 28 fully close the warm air passage 16 and fully open the upper cold air passage 18 and the lower cold air passage 20. The maximum heating position is a slide position at which the first air mixing door 26 and the second air mixing door 28 fully open the warm air passage 16 and fully close the upper cold air passage 18 and the lower cold air passage 20.

In addition, the first air mixing door 26 and the second air mixing door 28 may be positioned at an intermediate position between the maximum cooling position and the maximum heating position. In that case, the air having passed through the evaporator 13 is blown into the warm air passage 16, the upper cold air passage 18, and the lower cold air passage 20 at the air flow ratio corresponding to the slide positions of the first air mixing door 26 and the second air mixing door 28.

The air conditioning case 11 is provided with an upper mixing space 221 and a lower mixing space 222 on the air flow downstream side of the warm air passage 16, the upper cold air passage 18, and the lower cold air passage 20. The upper mixing space 221 is disposed on the upper side of the lower mixing space 222. The upper mixing space 221 and the lower mixing space 222 are connected to each other in the vertical direction. The upper mixing space 221 and the lower mixing space 222 form one cold and warm air mixing space 22 in which the warm air flowing out of the warm air passage 16 and the cold air flowing out of the cold air passages 18 and 20 are mixed. The upper mixing space 221 corresponds to a mixing space of the present disclosure.

Specifically, the upper cold air passage 18 and the sub warm air passage 16b of the warm air passage 16 are connected to the upper mixing space 221, and the lower cold air passage 20 and the main warm air passage 16a of the warm air passage 16 are connected to the lower mixing space 222.

For that reason, for example, when the defroster blowing port 38 or the face blowing port 40 is opened and the air in the lower mixing space 222 flows upward in the air conditioning case 11, eventually, the upper mixing space 221 becomes a space in which the air flowing out of the warm air passage 16, the upper cold air passage 18, and the lower cold air passage 20 are mixed with each other. When the foot blowing port 42 is opened and the air in the upper mixing space 221 flows downward in the air conditioning case 11, eventually, the lower mixing space 222 becomes a space in which the air flowing out of the warm air passage 16, the upper cold air passage 18, and the lower cold air passage 20 are mixed with each other.

The defroster blowing port 38 serving as the first blowing port and the face blowing port 40 serving as the second blowing port are opened on an upper surface portion of the air conditioning case 11. The defroster blowing port 38 is disposed in front of the face blowing port 40 in the vehicle. The defroster blowing port 38 and the face blowing port 40 are connected to the upper mixing space 221, and blow the air from the upper mixing space 221 into the vehicle interior.

Specifically, the defroster blowing port 38 is an air outlet for blowing the air from the upper mixing space 221 toward an inner surface of a vehicle front glass. The face blowing port 40 is a blowing port for blowing the air from the upper mixing space 221 toward an upper half of an occupant seated in a front seat.

Further, as illustrated in FIG. 1, a foot blowing port 42 as a third blowing port is opened in a rear portion of the air conditioning case 11. The foot blowing port 42 is connected to the lower mixing space 222, and blows the air from the lower mixing space 222 into the vehicle interior.

Specifically, the foot blowing port 42 is an air outlet for blowing the air from the lower mixing space 222 toward feet of the occupant in the vehicle interior.

The defroster blowing port door 32 is disposed in a first blowing passage 381 that allows the air to flow from the upper mixing space 221 into the defroster blowing port 38, and functions as a first blowing port open-close device that opens and closes the defroster blowing port 38 as a first air outlet. Specifically, the defroster blowing port door 32 is a rotary type plate door and is operated by an electric actuator not shown.

The defroster blowing port door 32 includes a flat plate-like door main body portion 321 and a door rotating shaft 322 that is fixed to one end of the door main body portion 321. The door main body portion 321 of the defroster blowing port door 32 rotates around the door rotating shaft 322 to open and close the defroster blowing port 38. An axis center of the door rotating shaft 322 is oriented along the vehicle width direction DR3 (refer to FIG. 2). For example, in FIG. 1, the defroster blowing port door 32 is shown with the defroster blowing port 38 closed, and in FIG. 7 the defroster blowing port door 32 is shown with the defroster blowing port 38 open.

Further, the foot blowing port door 36 functions as a third blowing port open-close device for opening and closing the foot blowing port 42 as the third blowing port. The foot blowing port door 36 is a rotating type plate door similar to the defroster blowing port door 32 and includes a flat plate-like door main body portion 361 for opening and closing the foot blowing port 42 and a door rotating shaft 362 that is fixed to one end of the door main body portion 361. The face blowing port door 34 will be described later.

The grid member 46 is a member for controlling the air flow in the upper mixing space 221 in order to reduce a temperature unevenness between the blown out air from the defroster blowing port 38 and the blown out air from the face blowing port 40. The grid member 46 is molded as a member different from the air conditioning case 11 and is disposed in a part of the upper mixing space 221 and fixed to the air conditioning case 11 by fitting or the like. The grid member 46 is shaped as illustrated in FIGS. 2 and 3.

Figure 2:
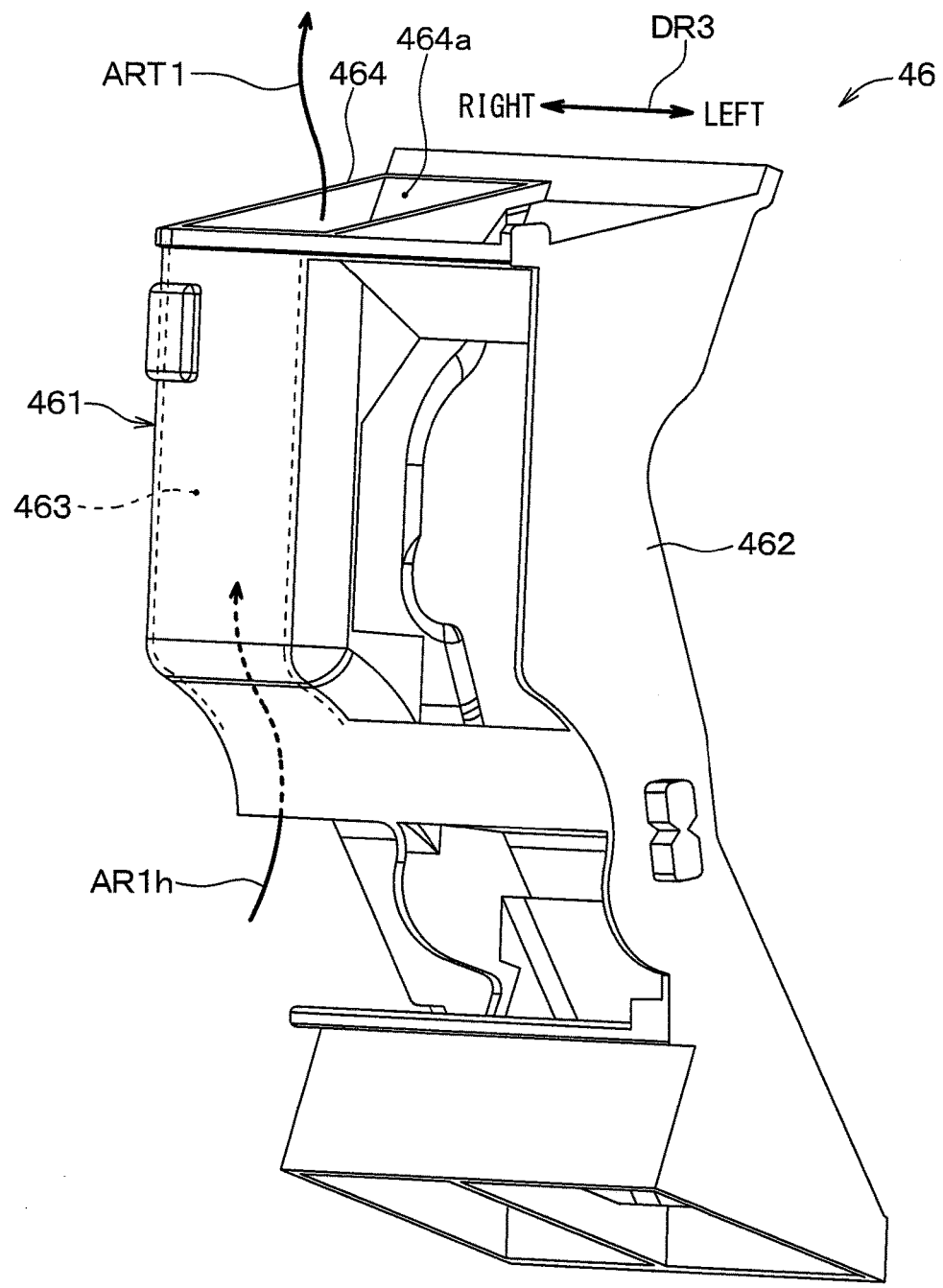
FIG. 2 is a perspective view of a single grid member when viewed in a direction of an arrow II in FIG. 1.
Figure 3:
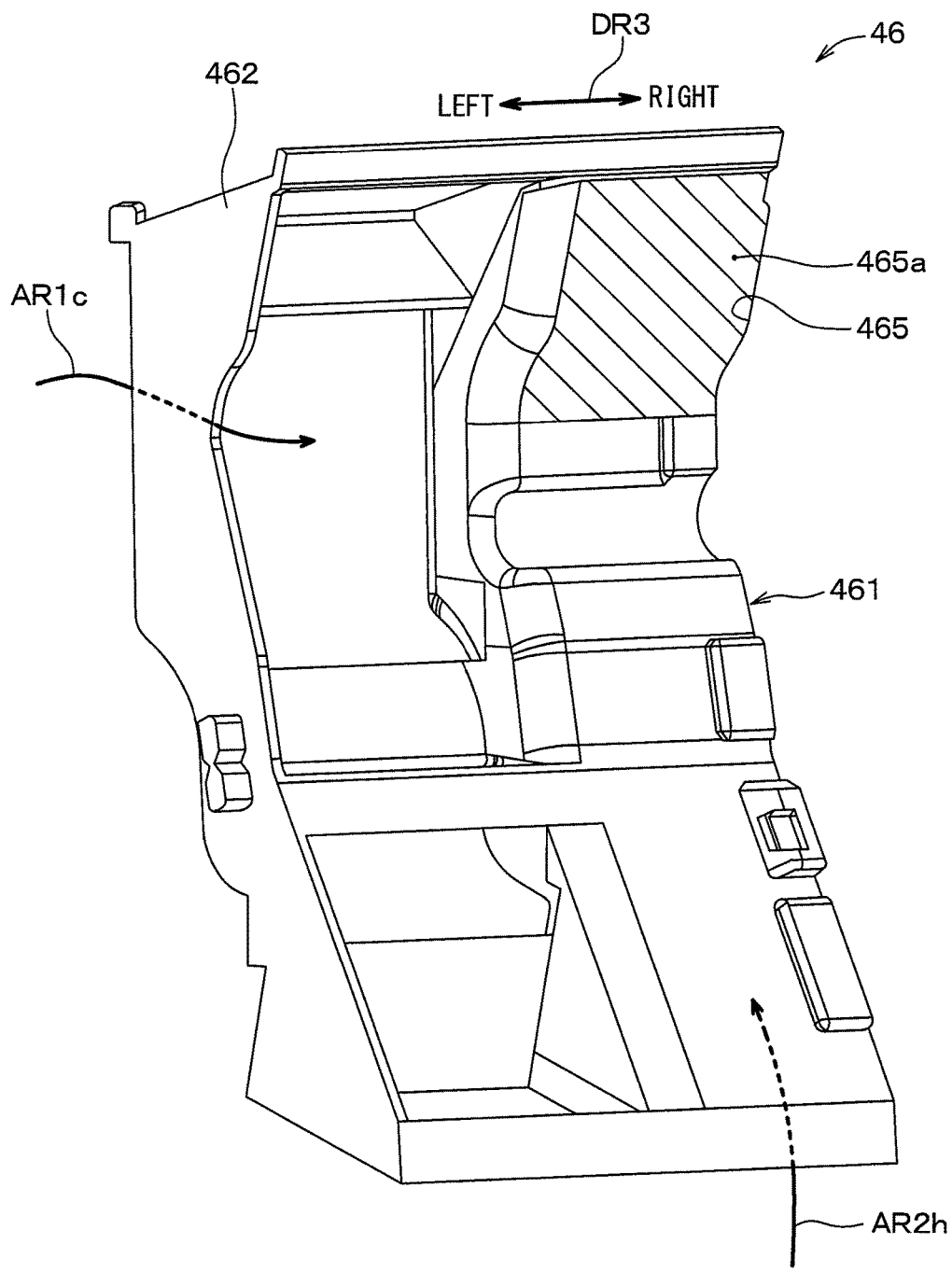
FIG. 3 is a perspective view of the single grid member when viewed in a direction of an arrow III in FIG. 1.

FIG. 2 is a perspective view of the single grid member 46 when the grid member 46 is viewed in a direction of an arrow II in FIG. 1, and FIG. 3 is a perspective view of the single grid member 46 when the grid member 46 is viewed in a direction of an arrow III in FIG. 1. As illustrated in FIGS. 2 and 3, the grid member 46 has a tunnel forming portion 461 and a non-tunnel portion 462. The tunnel forming portion 461 is disposed at one side of the non-tunnel portion 462 in the vehicle width direction DR3. The non-tunnel portion 462 is open to both the vehicle longitudinal direction DR1 and the vehicle vertical direction DR2. For that reason, as indicated by an arrow AR1c in FIG. 3, the air (that is, cold air) that flows into the upper mixing space 221 from the upper cold air passage 18 (refer to FIG. 1) passes through a space in the non-tunnel portion 462 and flows through one of the multiple blowing ports 38, 40, and 42.

As illustrated in FIGS. 2 and 3, the tunnel forming portion 461 is configured so that a tunnel passage 463 through which the air flows is provided inside the tunnel forming portion 461. The tunnel passage 463 is provided to extend in the vehicle vertical direction DR2, and a part of the air having passed through the heater core 15 flows into the tunnel passage 463 from below.

In more detail, as illustrated in FIGS. 1 to 3, the tunnel passage 463 is opened to the sub warm air passage 16b and the main warm air passage 16a at an upstream side (that is, a lower side) of the tunnel passage 463. For that reason, as indicated by an arrow AR1h in FIGS. 1 and 2, the air in the sub warm air passage 16b flows into the tunnel passage 463 from the lower side. At the same time, as indicated by the arrow AR2h in FIGS. 1 and 3, a part of the air in the main warm air passage 16a flows into the tunnel passage 463 from the lower side.

Further, as illustrated in FIGS. 1 to 3, the tunnel forming portion 461 has a first outflow portion 464 and a second outflow portion 465. The first outflow portion 464 provides a first outflow hole 464a, and allows the air in the tunnel passage 463 to flow out from the first outflow hole 464a into the defroster blowing port 38 as indicated by an arrow ART1 (refer to FIGS. 1 and 2). For example, the first outflow hole 464a of the first outflow portion 464 is opened obliquely upward, which is inclined forward. The first outflow portion 464 causes the air in the tunnel passage 463 to flow out toward a first blowing passage 381, and the air flows from the first blowing passage 381 to the defroster blowing port 38.

On the other hand, the second outflow portion 465 provides a second outflow hole 465a. The second outflow hole 465a is a vent hole separated from the first outflow hole 464a. The second outflow portion 465 causes the air in the tunnel passage 463 to flow out to the face blowing port 40 as indicated by an arrow ART2 (refer to FIG. 1) from the second outflow hole 465a. For example, the second outflow hole 465a of the second outflow portion 465 is opened obliquely rearward with the upward inclination. The second outflow portion 465 causes the air in the tunnel passage 463 to flow out toward a second blowing passage 401, and the air flows from the second blowing passage 401 to the face blowing port 40.

The second outflow portion 465 is provided in the middle of the passage of the air flowing through the tunnel passage 463 to the first outflow portion 464. In other words, the second outflow portion 465 allows the air in the tunnel passage 463 to flow out on the upstream side of the first outflow portion 464 in the air flow in the tunnel passage 463. As can be seen from the direction of the arrow ART2 in FIG. 1, the second outflow portion 465 opens toward a side opposite to the evaporator 13 side. Further, the first outflow portion 464 and the second outflow portion 465 are opened at a position closer to the upper side in the upper mixing space 221. In FIG. 3, the second outflow hole 465a is hatched for the purpose of clearly indicating the second outflow hole 465a.

As illustrated in FIG. 1, the tunnel forming portion 461 configured as described above is disposed so as to traverse the upper mixing space 221 vertically. Since the tunnel forming portion 461 is formed in a tubular shape and a tubular inner space of the tunnel forming portion 461 is a tunnel passage 463, the tunnel forming portion 461 causes the air (specifically, warm air) in the tunnel passage 463 to flow separately from the air (Specifically, cold air) flowing from the upper cold air passage 18. Therefore, the tunnel forming portion 461 enables the warm air flowing into the tunnel passage 463 to flow out from one or both of the first outflow portion 464 and the second outflow portion 465 without being hindered by the cool air flowing from the upper cold air passage 18.

As illustrated in FIG. 1, the air conditioning case 11 has a separation portion 111 as a passage partition wall that separates the first blowing passage 381 from the second blowing passage 401. As described above, the first blowing passage 381 is an air passage that allows the air to flow from the upper mixing space 221 to the defroster blowing port 38. However, the air flowing out of the first outflow portion 464 of the grid member 46 also flows into the first blowing passage 381. In other words, the first blowing passage 381 is also an air passage that allows the air to flow from the first outflow portion 464 to the defroster blowing port 38.

The second blowing passage 401 is an air passage that allows the air to flow from the upper mixing space 221 to the face blowing port 40. At the same time, since the air flowing out of the second outflow portion 465 of the grid member 46 also flows into the second blowing passage 401, the second blowing passage 401 is also an air passage that allows the air to flow from the second outflow portion 465 to the face blowing port 40.

Now, a description will be given of a relative positional relationship of the first blowing passage 381, the second blowing passage 401, and the heat exchangers 13, 15. First, the heater core 15 is arranged next to the evaporator 13 in the vehicle longitudinal direction DR1 as one direction. The first blowing passage 381 is provided on the evaporator 13 side of the separation portion 111 in the vehicle longitudinal direction DR1 and the second blowing passage 401 is provided on the side opposite to the evaporator 13 side of the separation portion 111 in the vehicle longitudinal direction DR1. Further, the first outflow portion 464 of the grid member 46 opens obliquely upward toward the evaporator 13 side while the second outflow portion 465 opens toward the opposite side to the evaporator 13 side.

In addition, when one space consisting of the upper mixing space 221 and the upper cold air passage 18 is referred to as an interposition space 48, the heater core 15 is disposed on an opposite side of at least a part of the interposition space 48 from the separation portion 111 of the air conditioning case 11.

Next, the face blowing port door 34 will be described. As illustrated in FIG. 1, the face blowing port door 34 is disposed at the rear of the grid member 46 in the upper mixing space 221 in the vehicle, and functions as a second blowing port open-close device that opens and closes the face blowing port 40 serving as the second blowing port. Specifically, the face blowing port door 34 is a rotary door and is operated by an electric actuator not shown.

Figure 4:
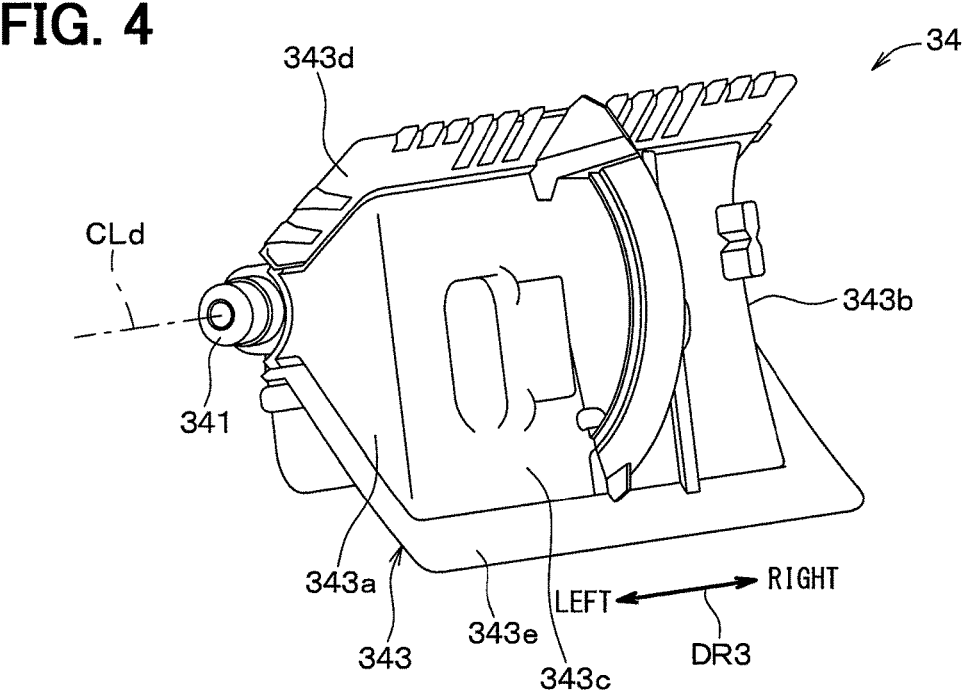
FIG. 4 is a perspective view of a single face blowing port door when viewed in a direction of an arrow IV in FIG. 1.
Figure 5:
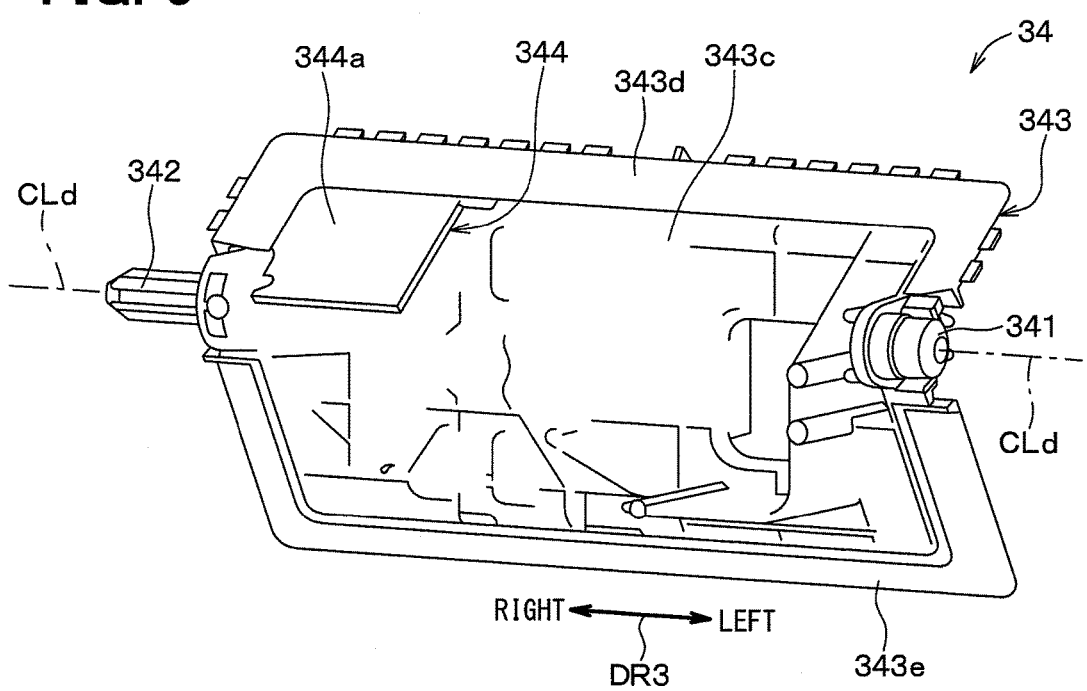
FIG. 5 is a perspective view of the single face blowing port door when viewed from an opposite side to that in FIG. 4.

As illustrated in FIGS. 4 and 5, the face blowing port door 34 includes door rotating shafts 341, 342, a door main body portion 343, and a tunnel lid portion 344. FIG. 4 is a perspective view of the single face blowing port door 34 when the face blowing port door 34 is viewed in a direction of an arrow IV in FIG. 1, and FIG. 5 is a perspective view of the single face blowing port door 34 when the face blowing port door 34 is viewed from the opposite side to that in FIG. 4. The face blowing port door 34 is made of resin, and the left and right door rotating shafts 341, 342, the door main body portion 343, and the tunnel lid portion 344 are integrally molded to configure the face blowing port door 34.

The axial direction of the door rotating shafts 341 and 342, that is, the axial direction of the door axis center CLd of the face blowing port door 34 coincides with the vehicle width direction DR3. The door main body portion 343 opens and closes the face blowing port 40 (refer to FIG. 1) while rotating around the door rotating shafts 341 and 342. Specifically, as illustrated in FIG. 1, the door main body portion 343 opens and closes the air flow upstream end of the second blowing passage 401, in other words, the door main body portion 343 opens and closes the face blowing port 40 on the air flow downstream side of the second outflow portion 465 of the grid member 46.

Figure 6:
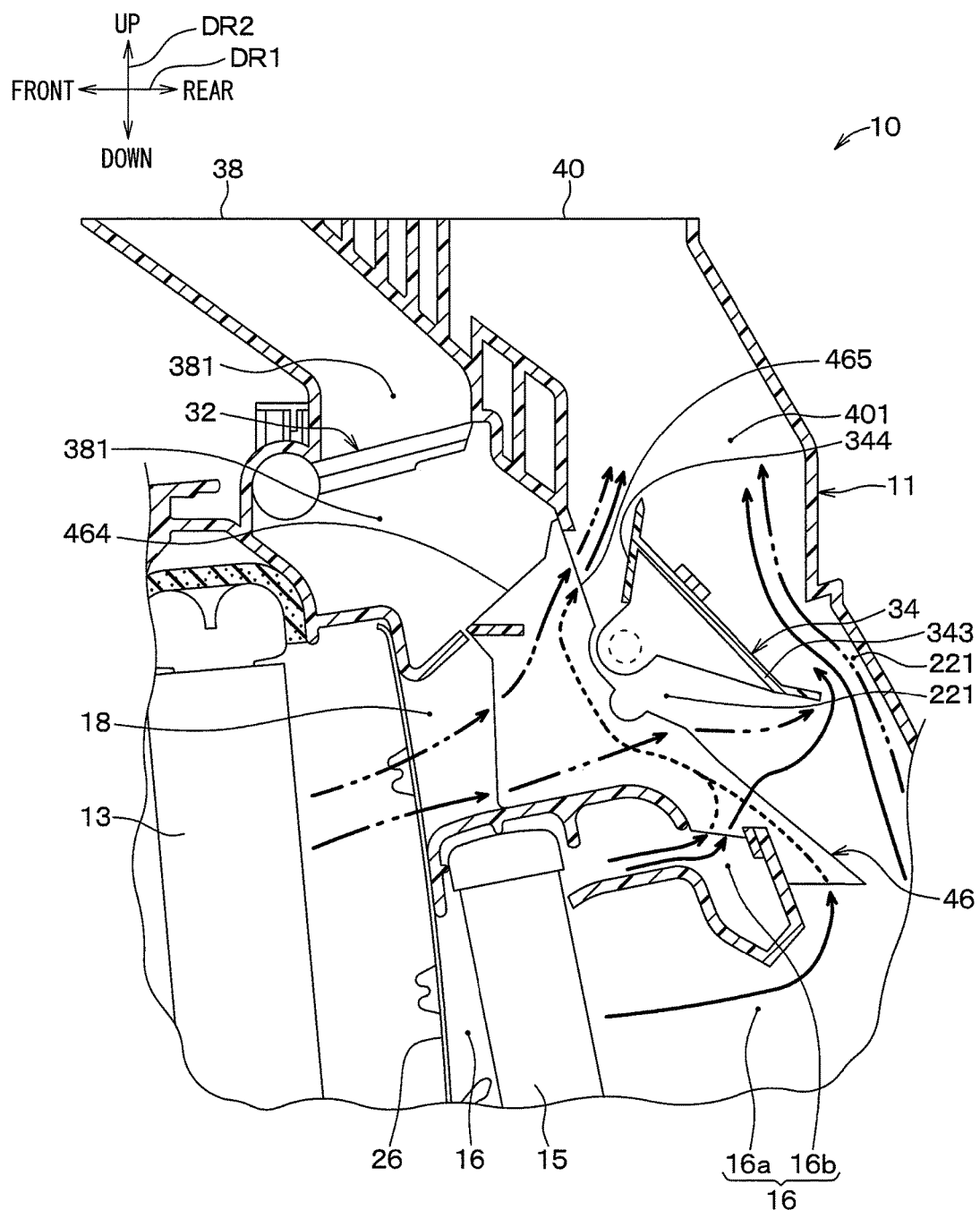
FIG. 6 is a partially enlarged cross-sectional view of the air conditioning unit for a vehicle viewed in the same cross section as that of FIG. 1, showing a main part of an air flow in an air conditioning case in a bi-level mode.
Figure 7:
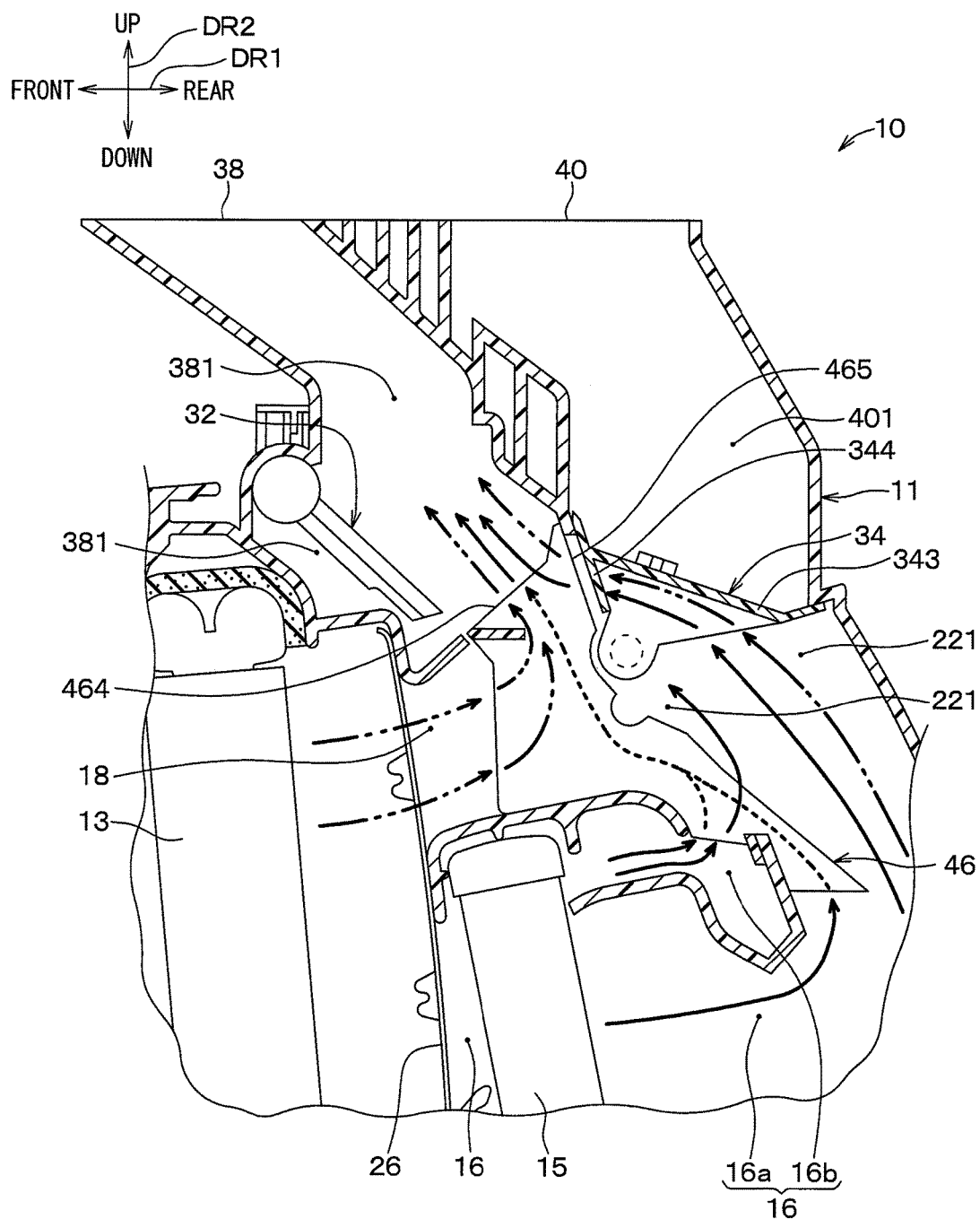
FIG. 7 is a partially enlarged cross-sectional view of the air conditioning unit for a vehicle viewed in the same cross section as that of FIG. 1, showing a main part of an air flow in an air conditioning case in a defroster mode.

For example, in FIG. 1, the face blowing port door 34 is in a fully opened position in which the face blowing port 40 is maximally opened, and in FIG. 7, the face blowing port door 34 is in a fully closed position in which the face blowing port 40 is closed. Further, in FIG. 6, the face blowing port door 34 is in a half open position which is an intermediate position between the fully opened position and the fully closed position. The face blowing port door 34 is located at any one of the three positions of the fully opened position, the half open position, and the fully closed position.

Returning to FIGS. 4 and 5, the door main body portion 343 includes right and left fan-shaped side plate portions 343*a*, 343*b*, an outer peripheral door surface 343*c*, and flange-like seal portions 343*d*, 343*e*. The left and right door rotating shafts 341 and 342 are formed so as to protrude to the left and right outside at a hub position of the fan shape of the left and right side plate portions 343*a* and 343*b*, and are rotatably supported by bearing holes not shown provided in the left and right side wall portions of the air conditioning case 11. An outer peripheral door surface 343*c* is joined to the outer peripheral end portions of the left and right fan-shaped side plate portions 343*a* and 343*b*. As a result, the left and right fan-shaped side plate portions 343*a* and 343*b* and the outer peripheral door surface 343*c* are integrally formed into a gate shape. An inner space of the gate shape always opens to the upper mixing space 221 (refer to FIG. 1).

The outer peripheral door surface 343*c* is located at a predetermined distance outward from the door axis center CLd of the face blowing port door 34 in the radial direction of the door rotating shafts 341 and 342, and extends in the axial direction of the door axis center CLd, to thereby form a predetermined wall area.

A seal structure of the face blowing port door 34 is a so-called lip seal type, and the flange-like seal portions 343*d* and 343*e* protrude outward in a flange shape from peripheral edge portions of the side plate portions 343*a* and 343*b* and the outer peripheral door surface 343*c*. The flange-like seal portions 343*d* and 343*e* are pushed against sealing parts of the air conditioning case 11 (refer to FIG. 1) facing the flange-like seal portions 343*d* and 343*e* while the face blowing port door 34 rotates in one direction around the door axis center CLd (specifically, counterclockwise in FIG. 1). As a result, the flange-like seal portions 343*d* and 343*e* seal a space between the door main body portion 343 and the air conditioning case 11.

The tunnel lid portion 344 operates integrally with the door main body portion 343 to open and close the second outflow portion 465 (refer to FIG. 1) of the tunnel forming portion 461. The tunnel lid portion 344 is disposed inside the outer peripheral door surface 343*c* of the door main body portion 343 in the radial direction of the door rotating shafts 341 and 342. The tunnel lid portion 344 opens and closes the second outflow portion 465 of the tunnel forming portion 461 while rotating around the door rotating shafts 341 and 342. For example, when the door main body portion 343 is located at a position where the door main body portion 343 closes the face blowing port 40 (that is, the fully closed position of the face blowing port door 34), the tunnel lid portion 344 is positioned to close the second outflow portion 465.

The tunnel lid portion 344 has a flat plate shape and has an outflow-portion facing surface 344*a* facing the second outflow portion 465 at a position where the second outflow portion 465 is closed. The outflow-portion facing surface 344*a* of the tunnel lid portion 344 rotates away from the second outflow portion 465 as the door main body portion 343 rotates from the position of closing the face blowing port 40 to the direction of opening the face blowing port 40.

In the air conditioning unit 10 of FIG. 1 configured as described above, the multiple blowing modes are alternatively realized. For example, the blowing mode includes a face mode, a foot mode, a bi-level mode, a defroster mode, and the like.

In the face mode, the defroster blowing port 38 illustrated in FIG. 1 is fully closed by the defroster blowing port door 32, and the foot blowing port 42 is fully closed by the foot blowing port door 36. At the same time, in the face mode, the face blowing port 40 is fully opened by locating the face blowing port door 34 at the fully opened position. The face blowing port door 34 is located at the fully opened position, to thereby supply the sufficient amount of air conditioning wind to the face blowing port 40. FIG. 1 shows the rotational positions of the respective doors 32, 34, and 36 in the face mode.

Further, in the foot mode, the defroster blowing port 38 is slightly opened by the defroster blowing port door 32 and the foot blowing port 42 is fully opened by the foot blowing port door 36. At the same time, in the foot mode, the face blowing port 40 is fully closed by locating the face blowing port door 34 at the fully closed position.

In the bi-level mode, the defroster blowing port 38 is fully closed by the defroster blowing port door 32, and the foot blowing port 42 is fully opened by the foot blowing port door 36. At the same time, in the bi-level mode, the face blowing port 40 is half opened by locating the face blowing port door 34 at the half opened position. As a result, the air in the air conditioning case 11 in the bi-level mode flows as illustrated in FIG. 6. In an example of FIG. 6, the air mixing doors 26 and 28 are located at an intermediate position between the maximum cooling position and the maximum heating position, and the air having passed through the evaporator 13 flows through the warm air passage 16, the upper cold air passage 18, and the lower cold air passage 20.

FIG. 6 is a partially enlarged cross-sectional view of the air conditioning unit 10 when viewed in the same cross section as that of FIG. 1, showing a main part of the air flow in the air conditioning case 11 in the bi-level mode. In FIG. 6, the flow of cold air is indicated by double-dotted chain arrows and the flow of warm air is indicated by solid or dashed arrows. The flow of warm air passing through the tunnel passage 463 of the grid member 46 in the warm air flow is indicated by broken arrows.

Specifically, in the bi-level mode, the respective cold air passing from the evaporator 13 through the upper cold air passage 18 and the lower cold air passage 20 (refer to FIG. 1) flows toward the face blowing port 40 and the foot blowing port 42. In the cold air, the cold air flowing toward the face blowing port 40 flows, for example, as indicated by the two-dot chain line arrows in FIG. 6.

In more detail, the cold air flowing from the upper cold air passage 18 to the face blowing port 40 flows to the face blowing port 40 after having passed through the space inside the non-tunnel portion 462 of the grid member 46. At this time, the cold air passing through the space in the non-tunnel portion 462 is branched into two flow paths by the face blowing port door 34 and flows into the face blowing port 40. The cold air flowing through one of the two flow paths mixes with the warm air flowing out of the second outflow portion 465 after having passing through the tunnel passage 463 of the grid member 46 from the warm air passage 16. The cool air flowing through the other of the two flow paths mixes with the cold air flowing toward the face blowing port 40 from the lower cold air passage 20 without flowing out to the foot blowing port 42, and the warm air that has not entered the tunnel passage 463 from the warm air passage 16. In this way, the cold air flows toward the face blowing port 40, but during flowing toward the face blowing port 40, the cold air is mixed with the warm air from the warm air passage 16 in the cold and warm air mixing space 22.

Further, part of the warm air having passed through the heater core 15 flows in the tunnel passage 463 (refer to FIG. 2) of the grid member 46 as indicated by a broken line arrow. At this time, since the defroster blowing port 38 is fully closed, the warm air in the tunnel passage 463 exclusively flows out of the opened second outflow portion 465 and flows in the face blowing port 40. Even if the warm air in the tunnel passage 463 flows out of the first outflow portion 464, the warm air eventually flows into the face blowing port 40. Since a part of the warm air is led to the face blowing port 40 through the tunnel passage 463, the amount of warm air is unlikely to be insufficient and a temperature unevenness of the air conditioning wind blown into the vehicle interior from the face blowing port 40 is reduced. The flow of cold air and warm air toward the face blowing port 40 described above is the same in the face mode.

In the defroster mode, the defroster blowing port 38 is fully opened by the defroster blowing port door 32, and the foot blowing port 42 is fully closed by the foot blowing port door 36. At the same time, in the defroster mode, the face blowing port 40 is fully closed by locating the face blowing port door 34 at the fully closed position. As a result, the air in the air conditioning case 11 in the defroster mode flows as illustrated in FIG. 7. In an example of FIG. 7, the air mixing doors 26 and 28 are located at an intermediate position between the maximum cooling position and the maximum heating position, and the air having passed through the evaporator 13 flows through the warm air passage 16, the upper cold air passage 18, and the lower cold air passage 20.

FIG. 7 is a partially enlarged cross-sectional view of the air conditioning unit 10 when viewed in the same cross section as that of FIG. 1, showing a main part of the air flow in an air conditioning case 11 in the defroster mode. In FIG. 7, like FIG. 6, the flow of cold air is indicated by double-dotted chain arrows and the flow of warm air is indicated by solid or dashed arrows. The flow of warm air passing through the tunnel passage 463 of the grid member 46 in the warm air flow is indicated by broken arrows.

Specifically, in the defroster mode, the cold air passing through the upper cold air passage 18 and the lower cold air passage 20 (refer to FIG. 1) from the evaporator 13 and the warm air passing through the heater core 15 are led to the defroster blowing port 38. The cold air and the warm air are mixed together in the cold and warm air mixing space 22.

Further, part of the warm air having passed through the heater core 15 flows in the tunnel passage 463 (refer to FIG. 2) of the grid member 46 as indicated by a broken line arrow. At this time, since the defroster blowing port 38 is fully opened and the second outflow portion 465 of the grid member 46 is closed by the tunnel lid portion 344 of the face blowing port door 34, the warm air in the tunnel passage 463 exclusively flows out of the first outflow portion 464 and flows into the defroster blowing port 38. Since a part of the warm air is led to the defroster blowing port 38 through the tunnel passage 463, the amount of warm air is unlikely to be insufficient and a temperature unevenness of the air conditioning wind blown into the vehicle interior from the defroster blowing port 38 is reduced. The flow of cold air and warm air toward the defroster blowing port 38 described above is the same in the foot mode.

As described above, according to the present embodiment, as shown in FIGS. 1 to 3, the tunnel forming portion 461 of the grid member 46 has the tunnel passage 463 into which a part of the air having passed through the heater core 15 flows from the warm air passage 16. Also, the first outflow portion 464 of the tunnel forming portion 461 causes the air in the tunnel passage 463 to flow out to the defroster blowing port 38, and the second outflow portion 465 of the tunnel forming portion 461 causes the air in the tunnel passage 463 to flow out to the face blowing port 40.

For that reason, if the defroster outlet 38 is opened by the defroster blowing port door 32, the warm air heated by the heater core 15 and passing through the tunnel passage 463 can flow into the defroster blowing port 38. When the face blowing port 40 is opened by the face blowing port door 34, the warm air heated by the heater core 15 and passing through the tunnel passage 463 can flow to the face blowing port 40. In other words, the warm air in the tunnel passage 463 can be efficiently led to the defroster blowing port 38 or the face blowing port 40 without being obstructed by the cold air flowing into the upper mixing space 221 from the upper cold air passage 18.

Therefore, even in the blowing mode in which one of the defroster blowing port 38 or the face blowing port 40 is opened, the insufficient amount of warm air led to the opened air outlet of the defroster blowing port 38 and the face blowing port 40 can be prevented. Along with the above configuration, for example, the temperature unevenness of the air blown out of the opened blowing port (in particular, the face blowing port 40) can be reduced. For example, the insufficient amount of the warm air introduced to the defroster blowing port 38 is prevented, to thereby improve the window clearness in the defroster mode.

Further, according to the present embodiment, when the door main body portion 343 is located at the position to close the face blowing port 40, the tunnel lid portion 344 of the face blowing port door 34 is located at a position to close the second outflow portion 465 of the grid member 46. Therefore, in the blowing mode in which the face blowing port 40 is closed, the warm air in the tunnel passage 463 can be caused to flow exclusively from the first outflow portion 464 of the grid member 46. For example, in the defroster mode, the warm air in the tunnel passage 463 can smoothly flow to the defroster blowing port 38.

Further, according to the present embodiment, the door main body portion 343 of the face blowing port door 34 opens and closes the face blowing port 40 on the air flow downstream side of the second outflow portion 465 of the grid member 46. Accordingly, in the blowing mode in which the face blowing port 40 is closed, the air flow from the second outflow portion 465 to the face blowing port 40 is prevented not only in the tunnel lid portion 344 of the face blowing port door 34 but also in the door main body portion 343.

Further, according to the present embodiment, in the grid member 46, the second outflow hole 465a of the second outflow portion 465 is formed as a separate hole from the first outflow hole 464a of the first outflow portion 464. Therefore, as compared with a case where the second outflow hole 465a is connected to the first outflow hole 464a to provide one hole, it is easy to configure the tunnel lid portion 344 of the face blowing port door 34 so as to close the second outflow hole 465a.

According to the present embodiment, as illustrated in FIG. 1, the tunnel forming portion 461 is disposed so as to traverse the upper mixing space 221 vertically. Therefore, the warm air of the warm air passage 16 can be led from the warm air passage 16 to the opposite side across the upper mixing space 221, specifically to the upper side of the upper mixing space 221 through the tunnel passage 463 of the tunnel forming portion 461.

Further, according to the present embodiment, the separation portion 111 of the air conditioning case 11 is a passage partition wall that separates the first blowing passage 381 from the second blowing passage 401. The first blowing passage 381 is a passage through which the air flows from the first outflow portion 464 of the grid member 46 to the defroster blowing port 38, and the second blowing passage 401 is a passage through which the air flows from the second outflow portion 465 of the grid member 46 to the face blowing port 40. Therefore, if the defroster blowing port 38 is open, the warm air flowing out from the first outflow portion 464 can be smoothly guided to the defroster blowing port 38. If the face blowing port 40 is opened, the warm air flowing out of the second outflow portion 465 can be smoothly led to the face blowing port 40.

Other Embodiments (1) In the embodiment described above, the face mode, the foot mode, the bi-level mode, and the defroster mode are exemplified as the blowing mode of the air conditioning unit 10, but the number of blowing modes is not limited. For example, a foot defroster mode in which the defroster blowing port 38 and the foot blowing port 42 are fully opened and the face blowing port door 34 is fully closed may be provided in addition to the four blowing modes.

(2) In the grid member 46 of the embodiment described above, the second outflow portion 465 is open as shown in FIG. 3, but the shape and position of the second outflow portion 465 is not limited. For example, the shape and position of the second outflow portion 465 may be appropriately determined according to the shape and placement of the face blowing port door 34 that opens and closes the second outflow portion 465.

(3) In the embodiment described above, the face blowing port door 34 is a rotary door, but may be a cantilever door similar to the defroster blowing port door 32 or a slide door. In the blowing mode for closing the face blowing port 40, if the face blowing port door 34 can close the face blowing port 40 and also close the second outflow portion 465 of the grid member 46, the face blowing port door 34 is not limited to the door type.

(4) In the embodiment described above, the defroster blowing port door 32 and the face blowing port door 34 are door devices separate from each other, but there is no need to mechanically separate the defroster blowing port door 32 and the face blowing port door 34 from each other. For example, it is conceivable that the defroster blowing port door 32 and the face blowing port door 34 configure one door device.

(5) In the above embodiment, although the evaporator 13 and the heater core 15 are disposed vertically, the evaporator 13 and the heater core 15 may be disposed in any direction according to the air flow in the air conditioning case 11.

(6) In the embodiment described above, two air mixing doors 26 and 28 are provided, but one or three or more air mixing doors may be used. Further, although the air mixing doors 26 and 28 are formed of film doors, other types of doors such as a plate-shaped door rotating around one axis may be used.

(7) In the embodiment described above, the warm air passage 16 is divided into the main warm air passage 16a and the sub warm air passage 16b on the air flow downstream side of the heater core 15, but may not be divided in such a manner.

(8) In the embodiment described above, two air passages of the upper cold air passage 18 and the lower cold air passage 20 are provided as bypass passages that bypass the warm air passage 16 and allow the air to flow. However, only one bypass passage may be provided. For example, the air conditioning case 11 without the lower cold air passage 20 is conceivable.

The present disclosure is not limited to the embodiments described above. The present disclosure includes various modification examples and modifications within the same range. Further, in the embodiments described below, it goes without saying that the components are not always indispensable unless otherwise stated or except the case where the components are apparently indispensable in principle. In the above-described embodiments, when a numerical value of the number, the numerical value, the quantity, the range, and the like of a configuration element of the embodiment are mentioned, the numerical value is not limited to the specified number excluding a case where it is clearly stated to be particularly essential and a case where it is obviously limited to the specified number. In the above-described embodiments, when a material, a shape, and a positional relationship of the configuration elements are described, the configuration elements are not limited to the material, the shape, and the positional relationship, except when the configuration elements are particularly specified and are limited to a specific material, shape, and positional relationship in principle.

What is claimed is:

1. An air conditioning unit for a vehicle, comprising:
   an air conditioning case that includes a first air passage through which air flows toward a vehicle interior, a second air passage through which air bypasses the first air passage and flows toward the vehicle interior, a mixing space that is connected to the first air passage and the second air passage and is a space where the air flowing out of the first air passage and the air flowing out of the second air passage are mixed, and a first blowing port and a second blowing port that are connected to the mixing space and are ports from which air is blown into the vehicle interior;
   a cooling heat exchanger that is disposed in the air conditioning case, cools air, and allows the cooled air to flow into the first air passage and the second air passage;
   a heating heat exchanger that is disposed in the first air passage, and heats air flowing in the first air passage;
   an air flow ratio adjusting device that adjusts a ratio between an amount of air flowing from the cooling heat exchanger to the first air passage and an amount of air flowing from the cooling heat exchanger to the second air passage;
   a first blowing port open-close device that opens and closes the first blowing port;
   a second blowing port open-close device that opens and closes the second blowing port; and
   a tunnel forming portion that is disposed in a part of the mixing space and provides a tunnel passage into which a part of air having passed through the heating heat exchanger flows from the first air passage, wherein
   the tunnel forming portion includes a first outflow portion through which the air flows from the tunnel passage to the first blowing port, and a second outflow portion through which the air flows from the tunnel passage to the second blowing port, and the tunnel forming portion separates the air flowing in the tunnel passage from the air flowing from the second air passage.

2. The air conditioning unit for a vehicle, according to claim 1, wherein
   the second blowing port open-close device includes a door main body portion that opens and closes the second blowing port, and a tunnel lid portion that operates integrally with the door main body portion to open and close the second outflow portion of the tunnel forming portion, and
   the tunnel lid portion is positioned to close the second outflow portion when the door main body portion is positioned to close the second blowing port.

3. The air conditioning unit for a vehicle, according to claim 2, wherein the door main body portion opens and closes the second blowing port downstream of the second outflow portion in an air flow.

4. The air conditioning unit for a vehicle, according to claim 2, wherein
   the second blowing port open-close device includes a door rotating shaft, and the door main body portion and the tunnel lid portion rotate about the door rotating shaft to open and close the second blowing port and the second outflow portion, respectively,
   the tunnel lid portion includes an outflow-portion facing surface (344a) that faces the second outflow portion when the tunnel lid portion is positioned to close the second outflow portion, and
   the outflow-portion facing surface rotates in a direction away from the second outflow portion when the door main body portion rotates in a direction to open the second blowing port from a position where the door main body portion closes the second blowing port.

5. The air conditioning unit for a vehicle, according to claim 1, wherein
   the first outflow portion provides a first outflow hole (461a), and allows the air to flow out of the tunnel passage through the first outflow hole, and
   the second outflow portion provides a second outflow hole (165a) separately from the first outflow hole, and allows the air to flow out of the tunnel passage through the second outflow hole.

6. The air conditioning unit for a vehicle, according to claim 1, wherein the tunnel forming portion extends across the mixing space.

7. The air conditioning unit for a vehicle, according to claim 1, wherein the second outflow portion allows the air to flow out of the tunnel passage upstream of the first outflow portion in the air flow in the tunnel passage.

8. The air conditioning unit for a vehicle, according to claim 1, wherein the air conditioning case includes a separation portion that separates a first blowing passage, through which the air flows from the first outflow portion to the first blowing port, from a second blowing passage through which the air flows from the second outflow portion to the second blowing port.

9. The air conditioning unit for a vehicle, according to claim 8, wherein
   the heating heat exchanger is arranged next to the cooling heat exchanger in one direction,
   the first blowing passage is disposed on a side of the separation portion facing the cooling heat exchanger in the one direction,
   the second blowing passage is disposed on a side of the separation portion facing away from the cooling heat exchanger in the one direction, and
   the second outflow portion is open to face away from the cooling heat exchanger.

10. The air conditioning unit for a vehicle, according to claim 8, wherein the heating heat exchanger is disposed on an opposite side of at least a part of an interposition space consisting of the mixing space and the second air passage from the separation portion.

11. The vehicle air conditioning unit for a vehicle, according to claim 1, wherein the first blowing port is a defroster blowing port, and the second blowing port is a face blowing port.

* * * * *

UNITED STATES PATENT AND TRADEMARK OFFICE
CERTIFICATE OF CORRECTION

PATENT NO. : 10,266,030 B2
APPLICATION NO. : 15/571999
DATED : April 23, 2019
INVENTOR(S) : Yamamoto Page 1 of 1

It is certified that error appears in the above-identified patent and that said Letters Patent is hereby corrected as shown below:

On the Title Page

Column 1, (86) PCT No.:, delete "PCT/JO2016/058595" and insert --PCT/JP2016/058595-- therefor.

Signed and Sealed this
Sixteenth Day of July, 2019

Andrei Iancu
*Director of the United States Patent and Trademark Office*